(12) United States Patent
Krishna et al.

(10) Patent No.: US 9,477,922 B2
(45) Date of Patent: Oct. 25, 2016

(54) UHF RFID WRISTBAND WITH A LONG READ RANGE

(75) Inventors: Pattabhiraman Krishna, Westboro, MA (US); Scott Barvick, Arlington, MA (US); John W. Thorburn, Jr., Groton, MA (US)

(73) Assignee: QUAKE GLOBAL, INC., San Diego, CA (US)

( * ) Notice: Subject to any disclaimer, the term of this patent is extended or adjusted under 35 U.S.C. 154(b) by 176 days.

(21) Appl. No.: 13/199,289

(22) Filed: Aug. 25, 2011

(65) Prior Publication Data

US 2012/0056719 A1 Mar. 8, 2012

Related U.S. Application Data

(60) Provisional application No. 61/379,172, filed on Sep. 1, 2010.

(51) Int. Cl.
*G08B 1/08* (2006.01)
*H04Q 5/22* (2006.01)
*G08B 13/14* (2006.01)
*G08B 23/00* (2006.01)
*G06K 19/077* (2006.01)

(52) U.S. Cl.
CPC ............................ *G06K 19/07762* (2013.01)

(58) Field of Classification Search
CPC ............ G06K 7/10861; G06K 7/10891; G06K 19/0723; G06K 2017/0045; G06K 19/0717; G06K 19/07758; G06K 19/027; G06K 19/005; G06K 19/041; G06K 19/072; A61B 2560/0406; A61B 5/0022; A61B 2019/448; A61B 2562/08; A61B 5/0002; A61B 5/681; A61B 2017/00734; A61B 2019/5251; A61B 2019/5475; A61B 2560/0214; A61B 5/6831; A61B 19/44; G06F 19/323; G06F 19/327; G06F 19/3418; G06F 19/3406; G06F 1/1626; G06F 1/163; G06F 1/1635; G06F 1/1656; G01S 13/878
USPC .............................. 340/10.1, 572.1, 539.12; 428/304.4–317.3
See application file for complete search history.

(56) References Cited

U.S. PATENT DOCUMENTS

| | | | | |
|---|---|---|---|---|
| 4,479,994 A * | 10/1984 | Berg | ........................... | 428/195.1 |
| 4,854,319 A * | 8/1989 | Tobin | ........................ | A61F 7/10 2/171.2 |
| 5,132,697 A * | 7/1992 | Tan | ................................. | 343/718 |
| 5,740,623 A * | 4/1998 | Juhan et al. | ..................... | 40/633 |
| 5,883,576 A * | 3/1999 | De La Huerga | ........... | 340/573.1 |
| 6,104,295 A * | 8/2000 | Gaisser et al. | ............. | 340/573.4 |
| 6,747,561 B1 * | 6/2004 | Reeves | ....................... | 340/573.1 |
| 6,888,502 B2 * | 5/2005 | Beigel et al. | .......... | 343/700 MS |
| 6,940,408 B2 * | 9/2005 | Ferguson | .......... | G06K 19/07749 257/673 |
| 7,168,626 B2 * | 1/2007 | Lerch et al. | ................... | 235/492 |
| 7,213,767 B2 * | 5/2007 | Tethrake | .............. | G06K 19/005 235/487 |
| 7,607,249 B2 * | 10/2009 | Singleton | ............ | B29C 45/1418 40/633 |

(Continued)

*Primary Examiner* — Emily C Terrell
(74) *Attorney, Agent, or Firm* — Procopio Cory Hargreaves and Savitch LLP; Pattric Rawlins

(57) ABSTRACT

A radio frequency identification wristband for attaching to a patient that has a band, a wristband housing attached to or integral with said band, one or more radio frequency identification tag(s) or tag inlay(s), an insulator material, wherein said wristband housing is adhered to said radio frequency identification tag or tag inlay, said radio frequency identification tag or tag inlay is adhered to an isolator material, and wherein said insulator material is nearest to the skin of the patient and insulates the radio frequency identification tag or tag inlay from the patient's skin.

14 Claims, 4 Drawing Sheets

(56) References Cited

U.S. PATENT DOCUMENTS

| | | | |
|---|---|---|---|
| 7,849,619 B2* | 12/2010 | Mosher et al. | 40/633 |
| 8,267,325 B2* | 9/2012 | Phaneuf | G06K 19/041 235/380 |
| 8,636,220 B2* | 1/2014 | Warther | G06K 19/07749 235/487 |
| 2005/0106376 A1* | 5/2005 | Leung et al. | 428/304.4 |
| 2005/0108912 A1* | 5/2005 | Bekker | 40/633 |
| 2006/0281864 A1* | 12/2006 | Nelson | 525/199 |
| 2008/0018468 A1* | 1/2008 | Volpi et al. | 340/572.1 |
| 2008/0290472 A1* | 11/2008 | Yagihashi et al. | 257/632 |
| 2009/0256757 A1* | 10/2009 | Chiang et al. | 343/702 |
| 2010/0271212 A1* | 10/2010 | Page | 340/573.1 |
| 2011/0041370 A1* | 2/2011 | Saint | G09F 3/005 40/633 |

\* cited by examiner

UHF RFID WRISTBAND WITH A LONG READ RANGE

This application claims priority from U.S. Provisional Application No. 61/379,172 filed Sep. 1, 2010.

FIELD OF THE INVENTION

The invention is in the field of Radio Frequency Identification (RFID).

BACKGROUND OF THE INVENTION

The present disclosure relates to a Radio Frequency Identification (RFID) based wristband system that is configured to be read at long read ranges even when it is attached to a human, most often on a human wrist, but could also be on other portions of the body such as the ankle.

The technique of identifying objects using radio frequency communications has been eponymously called Radio frequency identification (RFID).

RFID systems have been employed in an increasingly wide range of applications such as retail supply chain, postal logistics, healthcare, manufacturing, retail stores and airport baggage tracking. In retail supply chain applications, RFID has been used to track and trace goods throughout the supply chain, automate the receipt of pallets of shipments at distribution centers, increase shipping accuracy of goods from distribution centers (DCs) to stores, and manage inventory throughout the supply chain. In postal logistics FRID have been used to monitor the quality of service of postal shipments for international and national mail systems. For instance, a global postal organization has deployed RFID to over 40 countries around the world (and increasing) to measure and monitor quality of service of mail delivered between those countries. In healthcare, RFID is being used for asset and resource management, patient and staff tracking for improving patient flow within hospitals. In airports, specifically baggage tracking, RFID is being used as a replacement to barcode for quicker and more secure and accurate transfer of bags to improve the overall baggage handling rate.

Accordingly, RFID systems have been increasingly employed in diverse applications to facilitate the identification and tracking of merchandise, personnel, and other items and/or individuals that need to be reliably monitored and/or controlled within a particular environment. The introduction of RFID into these applications has resulted in a more secure, efficient and accurate system.

BRIEF DESCRIPTION OF RELATED ART

A conventional RFID system typically includes at least one RFID transponder or tag, at least one RFID Reader (or interchangeably referred to as interrogator), and at least one controller or server. The readers inventory the tags and forward the data to the server or controller.

At the physical layer of a passive UHF RFID system, RFID tags communicate by 'backscattering' signals that are concurrent with reader transmissions, and use a variety of frequencies and encodings under the control of the reader. This is in contrast to earlier HF tags based on inductive coupling that only provide read ranges of centimeters, and active tags that require batteries to increase range. There is a class of tags called Battery Assisted Passive (BAP) that may also be of interest. For some applications, more range or link margin may be needed than a passive tag, especially in environments with metals and water in which electromagnetic waves experience strong attenuation. More link margin may lead to better reading reliability and better interference control in harsh environments. BAP tags may overcome the read sensitivity limitation of passive tags by adding a battery to power the chip. The RF signal is now only used to carry the information not to supply power to the chip. These tags retain the reverse link of passive tags, i.e., backscatter the response. BAP tags fill the gap between purely passive tags and the more costly (battery-powered) active tags.

Each RFID reader typically follows a predefined sequence or protocol to interrogate and retrieve data from one or more RFID tags within the RF field of the reader (also known as the interrogation zone of the reader). It is noted that the interrogation zone of a reader is generally determined by the physical positioning and orientation of the reader relative to the tags, and the setting of various parameters (e.g., the transmit power) employed by the reader during the interrogation sequence. In systems employing passive tags, the interrogation zone is typically defined by the power coupling zone. For example, a typical interrogation sequence performed by an RFID reader includes transmitting a continuous wave (CW) to one or more passive tags within the reader's interrogation zone to power the tags, and transmitting a message packet (e.g., a request or command) by modulating the carrier signal. The passive tag then reads the message packet while tapping some of the energy of the CW to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the CW, and reflects a portion of the modulated wave back to the reader by changing the reflection characteristics of its antenna via a technique known as backscatter modulation.

The physical and logical layers of the communication between the Reader and the tag are defined by the air protocol. Specifically, the air protocol defines the signaling layer of the communication link, the Reader and tag operating procedures and commands, and the collision arbitration (also known as singulation) scheme to identify a specific tag in a multiple-tag environment. The world-wide standard air protocol in the UHF band is currently the EPCGlobal Class-1 Generation 2 (ISO 18000-6c) protocol. The present disclosure may use the Gen2 air protocol for the reader-to-tag communication, although the present disclosure should not be limited in this regard.

The collision arbitration (i.e., singulation) algorithm used in the Gen2 protocol is called the Q algorithm and is a variant of the slotted Aloha protocol. At the beginning of a round, the reader broadcasts the round size S to all the tags in its field of view. Each tag upon receipt of this initial message, generates a pseudo-random number between 1 and S. That becomes the target time-slot in which the tag responds. The reader is the time-keeper and advances time by sending slot messages to the tags. Each tag decrements its target slot counter—when it hits zero, the tag responds to the reader. At the reader receive side, the reader listens for tag response each slot. If exactly one tag responds, it initiates the state-machine to transact with the tag. In the case of a collision or an 'empty' slot, the reader either decides to resize S and start a new round or proceeds with this round. This is how a single RFID reader is able to identify multiple tags in a rapid manner. For example, the singulation rate in a dense reader environment is roughly 200 tags/second.

The communication protocol used between the reader and the controller or server is called a reader protocol. The EPCGlobal Low Level Reader Protocol (LLRP) is currently the standard reader protocol that is employed by most of the conventional readers around the world. The present disclosure may use the LLRP protocol for the reader-to-server communication, although the present disclosure should not be limited in this regard.

UHF RFID readers operate in the ISM band and are prone to external interference from cordless telephones, wireless headsets, wireless data networks. In addition, there may be interference due to other co-located readers. Each reader's RF receiver front end must be designed to withstand high-interference signal levels without introducing distortion that can cause tag response decoding errors. The receiver noise needs to be low so that it has sufficient dynamic range (Transmit power-Received Signal power from the tag) to allow error-free detection of low-level responding tag signals.

A forward link limited system may be limited by the receive sensitivity of the tag and hence beyond a certain distance there may not be enough RF energy incident on the tag to energize it and then subsequently backscatter its response. On the other hand, a reverse-link limited may be limited by the receive sensitivity of the reader, and hence beyond a certain distance between the tag and the reader, the reader may not be able to decode the tag responses correctly. Passive UHF RFID systems are typically forward link limited. That is because the state-of-the-art reader manufacturers have done a very good job in designing in sufficiently high dynamic range such that a reader is never backscatter limited for passive UHF tags. The dynamic range of the state of the art UHF reader is about 120 dBm and improving. A 120 dBm dynamic range gives a RF link budget of 60 dBm each way—thus, starting at a transmit power 30 dB with a 6 dB gain, and the forward link budget of 60 dBm, the limiting receive signal strength at the tag is −24 dB, which is much lower than the receive sensitivity of the best tag available in the marketplace of −18 dBm. Thus, the bottleneck with conventional UHF readers and passive tags, is the forward link to the tag.

However, if a battery assisted passive (BAP) tag is used, a different result may occur. The receive sensitivity of the state of the art BAP tag is −30 dBm. This means that even at the limit (or the reader's dynamic range) and beyond it, the BAP tag can be powered and respond to the reader's signal. This means that the system becomes reverse-link limited when interrogating BAP tags. This places stress on the design and implementation of the reader's receive path.

Certain behavior characteristics of electromagnetic fields may dominate at one distance from a radiating antenna, while a completely different behavior may dominate at another distance. At UHF frequencies, tags primarily use electromagnetic coupling in the far-field, which means that the readers couple with the tags primarily with propagating electromagnetic energy in the far field (distance greater than 2 wavelengths). However, when the tag is in the near field (distance less than 1 wavelength) of the reader antenna, coupling occurs using inductive coupling. One may design tags to couple with a reader antenna primarily using inductive coupling, giving rise to UHF near-field tags. The present disclosure may use UHF far-field tags.

A tag inlay may comprise a substrate, an antenna, and an integrated chip (IC). The inlay may be incorporated into a label (optionally printable) with pressure-sensitive adhesive or encapsulated in some other way.

The focus of UHF passive tags has been low cost designs leading to very simple antenna designs, primarily strip-line dipoles. Antennas are commonly made of aluminum, copper, silver ink or other low-cost materials. The power transfer efficiency is the measure of the impedance mismatch between the antenna ($R_A+jZ_A$) and the IC ($R_{chip}+jZ_{chip}$) and is given by $\tau=(4R_\downarrow chip\ R_\downarrow A)/\{\ |Z_\downarrow chip+Z_\downarrow A|\ \}\uparrow 2$. Antennas are typically designed to maximize the power delivered to the IC, and this typically happens only if antenna impedance is the complex conjugate (also referred to impedance matching) of the IC impedance.

Conventional tag designs are typically passive RFID tags, meant for general purpose supply-chain use cases, specifically designed for free space. The performance of such tags may degrade when placed near high dielectrics such as water. The dielectric constant of water is 80. This loss of performance may result because the close proximity to high dielectric material may cause a substantial shift in resonant frequency of the antenna causing it to not operate at a resonant mode, hence losing antenna efficiency; and also causing a shift in antenna impedance which may negatively impact the power transfer efficiency.

The human body is 60% water. Thus, when a tag that is optimized for free space is applied to the human body, the read distances may be severely impacted. For instance, a tag that reads close to 6 m in free space may not be readable at distances more than 0.5 m. Such degraded performance is typically unacceptable for a UHF RFID based people tracking solution in an enterprise scale. This performance is basically equivalent to a proximity HF based solution which is typically suitable for door access type applications, but not for general-purpose people tracking in indoor environments (within buildings). One such application of people tracking in indoor environments is patient tracking in hospitals. Patient tracking typically requires RFID tags to be in a wristband form-factor.

Conventional wristbands for patient identification are typically either barcode or HF tag based—both of these technologies may allow for proximity and line-of-sight based reading. Such limitations may not allow for patient tracking across a hospital. As mentioned above, wristband designs based on UHF passive tags may have severely degraded performance when applied on a patient's wrist.

On the other end of the spectrum, there are wristband designs based on active tags. Such tags may have the following limitations:

Wristbands built using active tags are typically bulky.

They may be very expensive—at least 10× that of UHF tags based solutions.

Due to high cost, customers conventionally reuse these wristbands. This may introduce a new workflow for the customer to manage—in terms of safety, cleanliness, identity management, and battery life management.

BRIEF SUMMARY OF THE INVENTION

A RFID wristband or leg band for attaching to a patient such as a human or other mammal. The wristband has a band that has attached thereto or integral therewith, a wristband housing. The housing is adhered to a RFID tag or tag inlay that in turn is adhered to an isolator material such as foam. The foam is nearest to the skin of the patient and insulates the RFID tag or tag inlay from the patient's skin.

DETAILED DESCRIPTION

In the present invention, a new UHF RFID Wristband design is disclosed that addresses the limits of purely passive UHF RFID based designs in a unique and innovative manner.

The wristband is based on UHF BAP tags. There are two inlays with batteries on the wristband.

The read range of these bands allows for continuous monitoring of moving human subjects in rooms and hallways while not requiring a dense RFID reader infrastructure.

The wristband material is latex free and hypoallergenic. It does not contain any harsh chemical additives such as antimicrobial agents that can cause contact dermatitis or other allergic reactions.

The wristband is easy to wipe and clean. It is waterproof and resistant to other fluids (soap, detergents, gels, spray, and alcohol cleaning products, blood and other bodily fluids). It is designed to allow the human subjects (e.g., hospital patient) to wash while wearing the wristband.

The wristband has no sharp corners, profiling or edges that may irritate or rub the skin.

The wristband may have an information area where hospital and patient info (including a barcode) may get printed.

The wristband is relatively secure and may be designed not to fall off. Also, the fastenings do not press into the skin.

All these features and capabilities enable human tracking using an UHF RFID based wristband in a reliable and robust manner, in clinical and non-clinical environments.

In accordance with the present disclosure, a UHF RFID based Wristband is disclosed that allows for a long read-range and can be used for tracking humans in primarily indoor environments—for example, tracking patients in healthcare environments, like, hospitals, clinics, laboratories.

Figure 4:
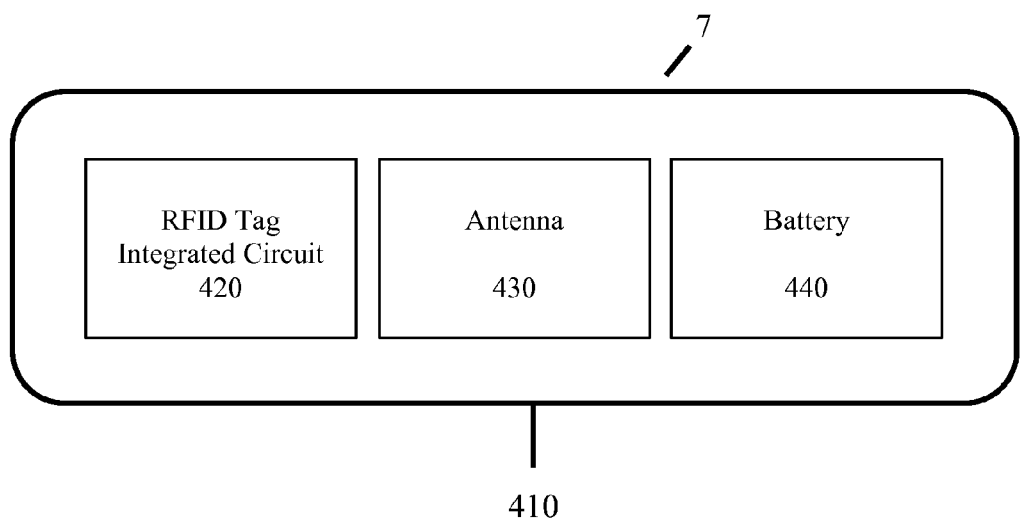
FIG. 4 illustrates a tag inlay, according to an embodiment.

An exemplary embodiment of the present disclosure is described. Other embodiments of the present disclosure may organize, aggregate, or disaggregate the components in various ways, and may add additional components, but the primary components providing the basic capabilities are typically:

RFID Section: 2 BAP tag inlays and batteries: each inlay 7 having an RFID tag IC 420, an antenna 430, a substrate 410, and a battery 440, as shown according to an embodiment in FIG. 4.

Isolator material: The isolator material may be at the bottom of the 2 inlays and batteries. The isolator material may be a foam with low dielectric constant of at least a certain thickness.

Wristband: In an exemplary embodiment, the wristband may be closed using a clasp. In such an embodiment, the wristband may have a number of holes on one side and the clasp on the other end. This wristband may be used to close the band around a wrist. In an alternative embodiment, an adhesive may be used to close the band. In such an embodiment, one side of the band may have an adhesive with a liner. The liner may be removed and attached to the other end of the band to close it. The wristband has attached or integrally thereto, a housing for enclosing and protecting the tag inlay.

Figure 1:
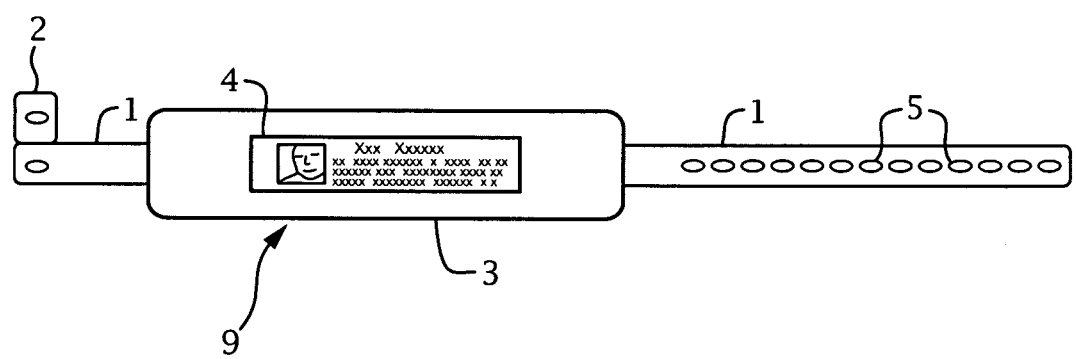
FIG. 1 illustrates an exemplary embodiment of the RFID enabled Wristband.

FIG. 1 is the top view of an exemplary embodiment of a wristband showing a band 1, a clasp 2, a RFID portion tag 3, a housing 9, an identity label 4 and holes 5 in the band 1 for receiving the clasp 2.

Figure 2:
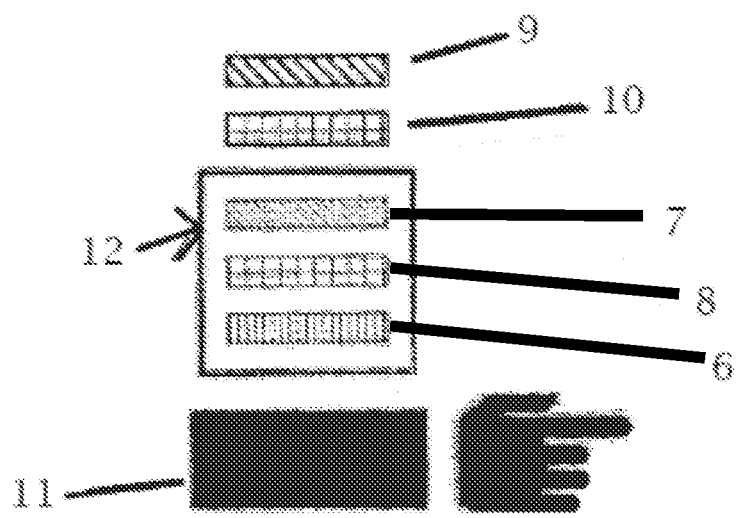
FIG. 2 illustrates the different layers in the exemplary wristband.

FIG. 2 is the side view of an exemplary embodiment of a wristband applied to the wrist. The side view shows the different layers in the entire wristband: the foam 6 adhered to the inlay(s) 7 using a medical grade adhesive 8. This assembly may be laminated and adhered to the wristband housing 9 using an adhesive, preferably a medical grade adhesive 10. Lamination is the uniting of two or more layers of material and sealing them together. An arm 11 is shown for demonstrating orientation of the lamination 12 of the device on the arm/wrist.

A medical grade adhesive is defined as adhesives that provide low toxicity or biocompatibility and resistance to sterilization processes.

The wristband may comprise a UHF RFID based tag inlay housing integrated with a wristband housing. Tags could be passive or battery-assist passive (BAP). A passive tag comprises a tag and an antenna; the BAP tag may have a tag, an antenna, and a battery. In an exemplary embodiment, the wristband has two passive tags integrated with foam and a wristband housing. In a preferred embodiment, the wristband has two BAP tags integrated with foam and wristband housing.

The foam may be of a low dielectric material with a dielectric constant as close to that of air as possible. The material may also be latex-free and hypoallergenic. Since, in the preferred embodiment, the tag and foam assembly is laminated, the foam may be hydrophobic or hydrophilic. In an alternate embodiment, the assembly may not be laminated, in which case the foam may be a hydrophobic material. An exemplary hydrophobic material is fine-cell, irradiation, cross-linked, polyolefin foam with water absorption of less than or equal to 0.04 lbs/cut surface, density of about 4 PCF. Depending on the material used, the thickness of foam may be less than or equal to 0.125 inches. The foam material may be a uniform surface or a complex structure with a dimpled surface. The dimpled surface may allow air pockets—the dielectric constant of air is 1.0. Such a surface may reduce the effective dielectric constant, and allow for thinner materials.

In an exemplary embodiment, the wristband housing may be a plastic band with a clasp closure on one end, and pre-punched holes on the other end, and a central label portion with a protective shield.

In an alternate embodiment, the wristband housing may be a plastic band with an adhesive closure and a central label portion with a protective shield.

The protective shield may offer protection when utilizing laser or paper labels. The shield may act as a barrier to protect patient data from fluid penetration, thus reducing the growth of bacteria. The shield may be made from clear, anti-glare material allowing easy reads of bar code information on the label.

Each RFID tag on the wristband has a 96 bit electronic product code (EPC) based identifier. In an exemplary embodiment, both tags on the band may be encoded with the same number. In an alternate embodiment, each tag on a band may be encoded with a different identifier, but those identifiers may have a fixed mathematical relationship to each other. In yet another alternate embodiment, each tag on the band may be encoded with an arbitrary yet unique identifier.

In an exemplary embodiment, the RFID tag may have a user memory that may be used to store additional information.

The two tag BAP based wristband solution may enable the read range of the wristband to extend up to 10 m depending on the mutual position between the reader and the wristband, and the tightness of the fit of the wristband on the human subject's wrist. In addition, due to multiple tags on the wristband, the read range may be at least 3 m independent of wristband orientation vis-à-vis reader antenna. The wristband may be read equally well on left or right wrists; and read equally well if the tag is facing the reader antenna or facing the body. Such a read range allows for continuous monitoring of moving human subjects in rooms and hallways while minimizing the number of readers required.

An exemplary process of creating a wristband as described in the above section is described in this section. The process described is for a clasp-based wristband. There are 3 components to the wristband:

1. A Wristband Housing
   Made of a durable, moisture proof, hypoallergenic material
   Has a number of holes arranged in a straight line along the axis of the band and one side of the band or the other that allows for and is/are used as a way to adjust the size of the band such that it can be placed around the wrist of a person
   A clear plastic window that is attached to one section of the tag that will allow for the insertion of some material that contains printed information about the person wearing the wristband
   Has 2 holes at one end of the wristband that are perpendicular to the axis of the wristband and can be used to insert materials used to lock the wristband onto the human subject.
2. An RFID inlay that has one or more UHF RFID tags that may or may not be battery assisted UHF RFID tags that is/are or can be made to be the same or similar size and shape as an existing hospital wristband as described in (1) above. The RFID tag(s) is/are encoded with a Electronic Product Code using a device that is an RFID reader and antenna(s) or contains an RFID reader and antenna(s) such as an RFID Label printer.
3. A synthetic foam that is hypo allergenic, latex free. The material may be hydrophobic or hydrophyllic.

A RFID enabled wristband is created using at least the elements described above or from other materials that have essentially the same characteristics as any or all of the above elements. The elements may be combined in such a manner that two of the elements are combined prior to the addition of the 3rd so as to make the process appear as if only two elements comprise the RFID wristband; this will be considered essentially the same as having the 3 separate elements combined in a manufacturing or assembly process.

An exemplary embodiment of the wristband housing is a conventional wristband (bar code based) that is employed in healthcare or other human identification bands. An example manufacturer of such conventional wristbands is St. John Inc.

The conventional hospital wristband will be acquired or created in single units or in a form factor that has multiple single wristbands attached to one another in such a manner as prescribed by the existing wristband manufacturer such that the wristbands can be separated into single units. If the existing wristband is acquired in a form factor that has multiple single wristbands such that the wristbands must be separated into single units, the mechanism of separating these wristbands may be done prior to the combination of the above elements, at any stage of the process that combines the elements or after the elements have been combined. The process of separating the wristband elements that are in a form factor that has multiple single units can be performed either one at a time or more than one at a time and may be done by a manual process or automated.

Figure 3:
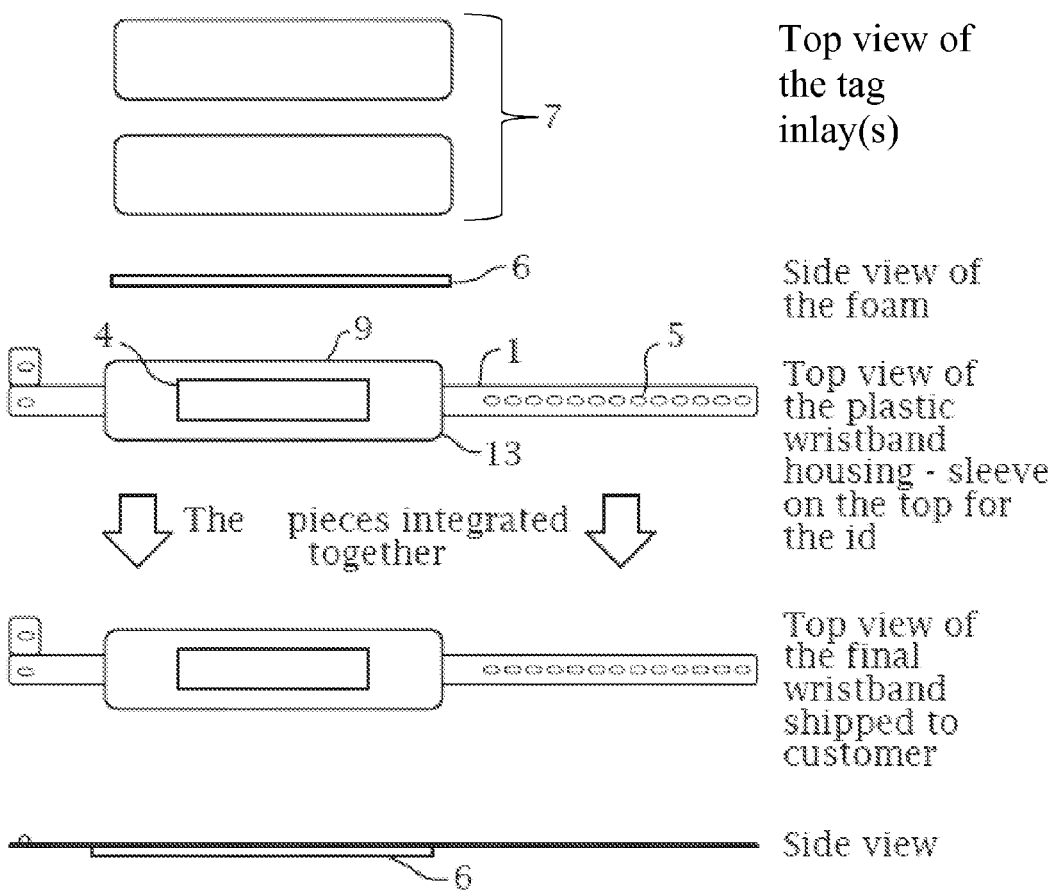
FIG. 3 illustrates the different components of the exemplary wristband.

The wristband housing may then be combined with the UHF RFID tags. The combination of the wristband housing and the RFID tags can be a manual process or automated process, performed by an individual or a machine and may be combined one or more simultaneously. The RFID tag may also be combined with synthetic foam prior to the RFID tag being attached to the wristband housing. The order of assembly is not the critical component, however the layers of the assembly are As shown in FIG. 3, the tag inlay(s) 7 are shown from a top view. The foam 6 is shown from a side view. The wristband housing 9 is shown from a top view and has an identity label 4 for displaying a patient's visual identification. The band 1 is shown attached to the wristband housing 9. The band 1 defines holes 5.

The synthetic foam may come as individual pieces that have been pre-cut to match the dimensions of the central portion of wristband housing or it may come in sheets or rolls that will need to be cut to the proper dimensions to allow the foam to be included in the RFID wristband. The process of cutting the foam may be done manually or automated and individuals or machines may perform either process.

The manual process of cutting the foam can be done by an individual or an individual using any type of simple or complex machine with any object or instrument that allows the material to be cut, ripped, sliced, stamped, burned, melted, molded or any other method that allows the material to be manipulated such that the finished foam has the dimensions required to be included in the RFID wristband.

The automated process of cutting the foam can be done by any type of simple or complex machine and may or may not have an operator to provide assistance in any manner to the machine. The machine can cut the foam with any object or instrument that allows the material to be cut, ripped, sliced, stamped, burned, melted, molded or any other method that allows the material to be manipulated such that the finished foam has the dimensions required to be included in the RFID wristband. The machine may or may not be specifically designed for the purpose of changing the shape of the foam for the specific purpose of attaching it to an RFID wristband.

A medical grade adhesive may be used to combine the wristband, RFID tag inlay, and synthetic foam together. The purpose of using a medical grade adhesive is to prevent allergic reactions or medical complications in the event the adhesive comes into contact with the skin of an individual. The adhesive may be sprayed, brushed, squeezed, pressed, pressured or applied in any way that combines the adhesive with one or more of the elements of the wristband elements. The process may be done one at a time or more than one at a time and may be performed by one or more individuals or by one or more machines.

In whatever order the elements are combined and whether a manual or automated process is used to combine the elements, the newly formed RFID wristband should have the edges/sides of the wristband sealed through a process that prevents moisture or liquid from entering between any and all of the layers of the RFID wristband. The edges or sides of the RFID wristband can be described as any or all surface areas of the wristband where all the elements can be viewed or seen and constitutes the total height of all of the elements combined. The sealing process may be done by heat, chemical reaction, or the application of an external material that acts as a barrier to prevent moisture or liquid from entering between the layers of the wristband.

The process of sealing the edges of the wristband can be completed manually or by a machine that applies/creates the sealed edge of the wristband.

The present disclosure is focused on UHF RFID technology, i.e., in the 860-960 Mhz band, which is the license-free ISM (industrial, scientific, and medical) band, although the present disclosure should not be limited in this regard.

Manual Process:

To create an RFID wristband using a manual or non-automated process, an individual, individuals, an operator, or operators would most likely perform a set of steps that may or may not be the same or similar those described herein and/or in a different order than may or may not be described herein to bring the elements together to create the RFID wristband:

- An individual, operator, individuals or operators may acquire one or more of the elements of the RFID wristband
- Any element(s) and/or material(s) being added or used to create the RFID wristband that do not conform to the dimensions of any or all of the other element(s) may need to be created, modified or made to conform in a manual and/or automated process or processes that may or may not be described in this document such that the element and/or elements meet the dimensions required to assemble or create the RFID wristband. The act or process of modifying or making a non-conforming element or elements conform with any other one or more other elements of the RFID wristband may be completed at any time before, during or after one or more of the elements of the RFID wristband have been attached or brought together.
- Medical grade adhesive may be applied to one or more element(s) of the RFID wristband using any method of application. The adhesive may be sprayed, brushed, squeezed, pressed, pressured or applied in any way that combines the adhesive with one or more of the elements of the wristband elements. The process may be done one at a time or more than one at a time and may be performed by one or more individuals or by one or more machines.
- The elements that have adhesive applied to them may then be combined such that the 2 or more elements align with one another and all of the elements overall. The method of alignment may be done by and individual or individuals using any tool(s), jig(s), dye(s), mold(s), frame(s) or other device or machine that would assist in the process of combining one or more elements of the RFID wristband together. This process may also be completed without the use of any tool(s), jig(s), dye(s), mold(s), frame(s) or other device or machine or may use tool(s), jig(s), dye(s), mold(s), frame(s) or other device or machine for some portion, but not all, of this process.
- Seal the edges of the wristband Automated Process:

- An individual, operator, individuals or operators may acquire one or more of the elements of the RFID wristband
- One of more of the elements may be added to a machine that can perform any one or more of the actions required to create the RFID wristband from its elemental components. This would include, but is not limited to or require, all of the following:
  Accept a single wristband housing individually,
  Accept wristband housings in a form factor that contains greater than one wristband housing,
  Create hospital wristbands from durable, moisture proof, hypo allergenic material.
  Accept a single RFID tag(s) individually
  Accept an RFID tag(s) in a form factor that contains greater than one RFID tag
  Accept a pre-formed foam individually that has the dimensions required to be included in the RFID wristband.
  Accept and process the foam with any object or instrument that allows the material to be cut, ripped, sliced, stamped, burned, melted, molded or any other method that allows the material to be manipulated such that the finished foam has the dimensions required to be included in the RFID wristband.
  Accept and apply the medical grade adhesive to one or more elements of the RFID wristband
- The machine may or may not combine one or more of the elements of the RFID wristband in order to create a portion of the RFID wristband or the RFID wristband in its entirety.
- The machine may insert the locking mechanism for the tag.
- Separate machines may process or combine one or more of the elements of the RFID wristband or add the medical grade adhesive to the elements.
- The process of sealing the edges of the wristband may be completed manually or by a machine that applies/creates the sealed edge of the wristband.
- The machine(s) may or may not be built specifically to perform any or all of the process(es).

It will be appreciated by those of ordinary skill in the art that further modifications to and variations of the above-described process of creating a RFID enabled wristband including a wristband housing, foam and RFID tags may be made without departing from the inventive concepts, spirit and scope of the invention disclosed herein. Accordingly, the present disclosure should not be viewed as limited by the specific embodiments described herein.

What is claimed is:

1. A radio frequency identification wristband for attaching to a patient, the radio frequency identification wristband comprising:
   a band;
   a wristband housing attached to or integral with said band;
   two or more radio frequency identification battery-assisted-passive (BAP) tag inlays, wherein each radio frequency identification BAP tag inlay comprises a radio frequency identification tag integrated circuit and an antenna; and
   a polyolefin foam having a low dielectric constant, wherein the polyolefin foam comprises a dimpled surface and has a water absorption of less than or equal to 0.04 lbs/cut surface;
   wherein said wristband housing is adhered to at least one of the two or more radio frequency identification BAP tag inlays using a first adhesive, wherein at least one of the two or more radio frequency identification BAP tag inlays is adhered to said foam using a second adhesive, wherein the second adhesive is resistant to sterilization, wherein, when the radio frequency identification wristband is worn by a patient, said foam is nearer to the skin of the patient than any of the two or more radio frequency identification BAP tag inlays, and insulates at least one of the two or more radio frequency identification BAP tag inlays from the patient's skin, wherein each of the two or more radio frequency identification BAP tag inlays is configured to communicate a different identifier than the other ones of the two or more radio frequency identification BAP tag inlays, and wherein the different identifiers have a fixed mathematical relationship to each other.

2. The radio frequency identification wristband of claim 1, wherein said wristband housing is adhered to at least one of the two or more radio frequency identification BAP tag inlays and at least one of the two or more radio frequency identification BAP tag inlays is adhered to the foam using a medical grade adhesive.

3. The radio frequency identification wristband of claim 1, further comprising a visual identity label.

4. The radio frequency identification wristband of claim 1, wherein said foam is a latex free material.

5. The radio frequency identification wristband of claim 1, wherein said foam is hypoallergenic.

6. The radio frequency identification wristband of claim 1, wherein at least one of the two or more radio frequency identification BAP tag inlay and said foam are laminated.

7. The radio frequency identification wristband of claim 1, wherein at least one of the two or more radio frequency identification BAP tag inlays and said foam are non-laminated and said foam is hydrophobic.

8. The radio frequency identification wristband of claim 1, wherein said band comprises a clasp on one end and comprises one or more holes on an opposite end for receiving said clasp.

9. The radio frequency identification wristband of claim 1, wherein said wristband is capable of being affixed to an ankle.

10. The radio frequency identification wristband of claim 8, wherein said housing is located between said clasp and said opposite end.

11. The each of the two or more radio frequency identification BAP tag inlays is at least one of the two or more radio frequency identification BAP tag inlays is configured to communicate a 96-bit identifier.

12. The radio frequency identification wristband of claim 1, wherein each of the two or more radio frequency identification BAP tag inlays comprises a user memory for storing information.

13. The radio frequency identification wristband of claim 1, wherein the foam is hydrophilic.

14. The radio frequency identification wristband of claim 1, wherein each of the two or more radio frequency BAP tag inlays comprises a radio frequency identification tag integrated circuit, an antenna, a substrate, and a battery.

* * * * *